Patented May 31, 1932

1,860,434

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing. Application filed August 22, 1928. Serial No. 301,438.

This invention relates to the art of preserving rubber, either in a vulcanized or unvulcanized condition, and to rubber compositions so preserved.

It is well known that many condensation products of aldehydes with aromatic amines, and particularly of aldol, butyraldehyde, or crotonaldehyde with anisidine, benzidine, alpha-naphthylamine, etc., are substantially non-accelerators of vulcanization, and possess the property of retarding the deterioration of rubber or rubber compositions into which they have been incorporated. It is also known that secondary aromatic amines such as diphenylamine, phenyl-beta-naphthylamine, tolyl-beta-naphthylamine, and dinaphthylamine, and especially poly-secondary-amines such as symmetrical diphenyl-p-phenylene-diamine possess to a high degree the property of retarding the deterioration of rubber. However, although the first-mentioned class of aldehyde-amine condensation products are, in general, oils, or resins of low melting point, and possess other properties which make them valuable compounding ingredients in rubber compositions, they are not as powerful age-resisters as the pure secondary amines. Many of them have the added disadvantages of possessing a disagreeable penetrating odor, which they impart to vulcanized rubber stocks, and of staining light-colored rubber stocks. On the other hand the secondary aromatic amines are, in general, crystalline solids, which are not as readily incorporated into rubber compositions as oils or resins, and many of which also exhibit a tendency to bloom, that is, to crystallize upon the surface of a rubber composition into which they have been incorporated.

This invention, in brief, consists in treating rubber or rubber compositions with such of the condensation products of aldehydes with secondary aromatic amines, or of aldehydes with bodies which are at the same time primary and secondary amines, as are resins and are substantially non-accelerators of vulcanization. This includes the condensation products of diarylamines with formaldehyde, such as the resins formed by the reaction of diphenylamine, phenyl-beta-naphthylamine, dinaphthylamine, or tolyl-alpha-naphthylamine with formaldehyde. The diarylamines do not react with the higher aldehydes to form homogeneous resins, and such products as are formed are either not age-resisters or are rather poor age-resisters; therefore I specifically exclude such non-resinous reaction products. The polysecondary amines, like the mono-secondary amines, form resinous condensation products with formaldehyde, which, in this case, are excellent age-resisters. For example such products are formed by symmetrical diphenyl-p-phenylene-diamine, symmetrical di-beta-naphthyl-p-phenylene diamine, and p, p' di (phenylamino)-diphenylamine reacting with formaldehyde. The primary-secondary amines react more generally with aldehydes to form resinous substances which are age-resisters. Among these substances are the reaction products of p-amino-diphenylamine with aldol or butyraldehyde, p-aminophenyl-beta-naphthylamine with formaldehyde, aldol or butyraldehyde, and p, p'-diamino-diphenyl-amine with aldol or butyraldehyde, as well as substitution products of the above-named or other similar products The terms "aryl" and "aromatic" are hereinafter employed in the customary sense to indicate radicals attached to the remainder of the molecule through a direct bond to one of the carbon atoms of the aromatic nucleus.

All of the resinous condensation products of secondary aromatic amines with aldehydes are readily incorporated into rubber, and do not bloom. They have the effect of softening rubber and rendering it more readily and smoothly workable on the calender or in the tubing machine. They have in general only a slight odor which does not appear in the finished rubber products.

Any of the above-named class of products may be incorporated into unvulcanized rubber, preferably from 0.1 to 5 parts by weight to 100 parts of rubber being used. If desired, the rubber may then be vulcanized by any means known to the art. Rubber so treated, whether preserved in the vulcanized or unvulcanized condition will resist deterioration and retain its useful properties much longer than similar compositions not so treated.

*Example 1.*—As a specific example of one embodiment of the method of this application, a typical tire tread stock was prepared containing: blended plantation rubber 100 parts by weight, sulfur 5.5 parts, zinc oxide 30 parts, gas black 40 parts, mineral rubber 10 parts, palm oil 5 parts, and hexamethylene tetramine 0.75 parts. This composition was divided into two parts, one of which was used as a control. To the other part was added 0.95 parts by weight (0.5% of the composition) of the resin formed by the reaction of phenyl-beta-naphthylamine with formaldehyde. After a thorough mixing, the two batches were vulcanized in a press for 45 minutes at 294° F. to produce an optimum cure. They were then tested to compare the rates of aging of the compositions with and without the age-resister by measuring the tensile strength and elongation at the breaking point before and after aging. As accelerated aging tests, different samples were placed in the Geer oven, in which they were maintained at a temperature of 158° F. in a constantly renewed stream of air, and in the Bierer-Davis bomb, in which they were maintained at the same temperature in an atmosphere of oxygen at a pressure of 300 lbs. per sq. in. The results of the tests are shown in the following table:

Tensile strength and elongation at breaking point

| Exposure | Without formaldehyde-phenyl-beta-naphthylamine | | With formaldehyde-phenyl-beta-naphthylamine | |
|---|---|---|---|---|
| | Tensile strength lbs. per sq. in. | Elongation | Tensile strength lbs. per sq. in. | Elongation |
| Before aging | 3488 | 613% | 3559 | 647% |
| After 7 days in Geer oven | 1749 | 463% | 2550 | 570% |
| After 48 hrs. in Bierer-Davis bomb | 896 | 365% | 2785 | 623% |

*Example 2.*—As another specific example of the method, rubber compositions were prepared similar to those above, but as age-resister the resin from formaldehyde and symmetrical diphenyl-p-phenylene-diamine was substituted for that from formaldehyde and phenyl-beta-naphthylamine. After vulcanization the compositions were tested as before with the following results:

Tensile strength and elongation at breaking point

| Exposure | Without age-resister | | With age-resister | |
|---|---|---|---|---|
| | Tensile strength lbs. per sq. in. | Elongation | Tensile strength lbs. per sq. in. | Elongation |
| Before aging | 3789 | 667% | 3947 | 683% |
| After 7 days in Geer oven | 1778 | 408% | 3513 | 613% |
| After 48 hrs. in Bierer-Davis bomb | 832 | 353% | 3318 | 627% |

*Example 3.*—As another specific example of the method, rubber compositions were prepared similar to those above, but the resin from the reaction of aldol and p-amino-diphenylamine was used as the age-resister. After vulcanization they were tested as before with the following results:

Tensile strength and elongation at breaking point

| Exposure | Without aldol-p-amino-diphenylamine | | With aldol-p-amino-diphenylamine | |
|---|---|---|---|---|
| | Tensile strength lbs. per sq. in. | Elongation | Tensile strength lbs. per sq. in. | Elongation |
| Before aging | 3857 | 647% | 3782 | 670% |
| After 7 days in Geer oven | 1777 | 402% | 2657 | 588% |
| After 48 hrs. in Bierer-Davis bomb | 740 | 188% | 2817 | 283% |

From the examples given it is evident that the resinous condensation products of secondary aromatic amines with aldehydes are very effective in retarding the deterioration normally incident to the aging of rubber.

Inasmuch as the compounds of this class are very effective in preventing resinification and the development of tack in crude rubber, they may be added to the rubber latex before coagulation in the form of a fine powder or aqueous dispersion, or may be milled into the coagulated crude rubber. Rubber so treated may be stored for much longer periods than untreated rubber, without the development of surface tack.

It is to be understood that the term "treating" as employed in the appended claims is used in a generic sense to include either the incorporation of the resinous condensation products of secondary aromatic amines with aldehydes into the rubber by milling or similar process, or to the application thereof to the surface of a mass of crude or vulcanized rubber. The term "rubber" is likewise employed in the claims in a generic sense to include caoutchouc, balata, gutta percha, rubber isomers, and like products, whether or not admixed with fillers, pigments, vulcanizing or accelerating agents.

I claim:

1. The method of preserving rubber which comprises treating rubber with the condensation product of symmetrical diphenyl-p-phenylene-diamine with formaldehyde.

2. The method of preserving rubber which comprises treating rubber with the condensation product of p-amino-diphenylamine with aldol.

3. A composition of matter comprising rubber and the condensation product of symmetrical diphenyl-p-phenylene-diamine with formaldehyde.

4. A composition of matter comprising rubber and the condensation product of p-amino-diphenyl-amine with aldol.

5. A rubber product resulting from the vulcanization of a composition comprising a vulcanizing agent, an accelerator of vulcanization, and the condensation product of symmetrical diphenyl-p-phenylene diamine with formaldehyde.

6. The method of preserving rubber which comprises treating rubber with the condensation product of an aliphatic aldehyde with a diarylamine containing two amino groups.

7. The method of preserving rubber which comprises treating rubber with the condensation product of an aliphatic aldehyde with an aryl substituted phenylene diamine.

8. The method of preserving rubber which comprises treating rubber with the condensation product of formaldehyde with an aryl substituted p-phenylene diamine.

9. The method of preserving rubber which comprises treating rubber with the condensation product of formaldehyde with a diaryl p-phenylene diamine.

10. The method of preserving rubber which comprises treating rubber with the condensation product of an aliphatic aldehyde with a primary amino substituted diarylamine.

11. The method of preserving rubber which comprises treating rubber with the condensation product of an aliphatic aldehyde with a p-amino phenyl-arylamine.

12. A composition comprising rubber and the condensation product of an aliphatic aldehyde with a diarylamine containing two amino groups.

13. A composition comprising rubber and the condensation product of an aliphatic aldehyde with an aryl substituted phenylene diamine.

14. A composition comprising rubber and the condensation product of formaldehyde with an aryl substituted p-phenylene diamine.

15. A composition comprising rubber and the condensation product of formaldehyde with a diaryl p-phenylene diamine.

16. A composition comprising rubber and the condensation product of an aliphatic aldehyde with a primary amino substituted diarylamine.

17. A composition comprising rubber and the condensation product of an aliphatic aldehyde with a p-amino phenyl-arylamine.

18. A rubber composition which has been vulcanized in the presence of the condensation product of an aliphatic aldehyde with an aryl substituted phenylene diamine.

19. A rubber composition which has been vulcanized in the presence of the condensation product of formaldehyde with an aryl substituted p-phenylene diamine.

20. A rubber composition which has been vulcanized in the presence of the condensation product of an aliphatic aldehyde with a primary amino substituted diarylamine.

21. The method of preserving rubber which comprises treating rubber with the condensation product of an aliphatic aldehyde with an aryl-naphthylamine containing two amino groups.

22. The method of preserving rubber which comprises treating rubber with the condensation product of butyraldehyde with p-aminophenyl-beta-naphthylamine.

23. A composition comprising rubber and the condensation product of an aliphatic aldehyde with an aryl-naphthylamine containing two amino groups.

24. A composition comprising rubber and the condensation product of butyraldehyde with p-aminophenyl-beta-naphthylamine.

25. The method of preserving rubber which comprises treating rubber with the condensation product of formaldehyde with a diarylamine containing two amino groups.

26. The method of preserving rubber which comprises treating rubber with the condensation product of formaldehyde with an aryl substituted arylene diamine.

27. A composition comprising rubber and the condensation product of formaldehyde with a diarylamine containing two amino groups.

28. A composition comprising rubber and the condensation product of formaldehyde with an aryl substituted arylene diamine.

29. A rubber composition which has been vulcanized in the presence of the condensation product of formaldehyde with a diarylamine containing two amino groups.

30. The method of preserving rubber which comprises treating rubber with the condensation product of an aliphatic aldehyde containing more than one carbon atom with a diarylamine containing two amino groups.

31. The method of preserving rubber which comprises treating rubber with the condensation product of a straight chain aliphatic aldehyde with a diarylamine containing two amino groups.

32. The method of preserving rubber which comprises treating rubber with the condensation product of an aliphatic aldehyde containing more than one carbon atom with a primary amino substituted diarylamine.

33. A composition comprising rubber and the condensation product of an aliphatic aldehyde containing more than one carbon atom with a diarylamine containing two amino groups.

34. A composition comprising rubber and the condensation product of a straight chain aliphatic aldehyde with a diarylamine containing two amino groups.

35. A composition comprising rubber and the condensation product of an aliphatic aldehyde containing more than one carbon atom with a primary amino substituted diarylamine.

In witness whereof I have hereunto set my hand this 18th day of August, 1928.

WALDO L. SEMON.

CERTIFICATE OF CORRECTION.

Patent No. 1,860,434.  May 31, 1932.

WALDO L. SEMON.

It is hereby certified that error appears in the printed specification of the above numbered patent requiring correction as follows: Page 1, line 10, for "and" read "but"; page 2, line 94, first column of boxed table, for "After 7 days i n" read "After 7 days in Geer oven"; and that the said Letters Patent should be read with these corrections therein that the same may conform to the record of the case in the Patent Office.

Signed and sealed this 10th day of January A. D. 1933.

M. J. Moore
Acting Commissioner of Patents.

(Seal)

DISCLAIMER 1,860,434.—*Waldo L. Semon*, Cuyahoga Falls, Ohio. RUBBER COMPOSITION AND METHOD OF PRESERVING RUBBER. Patent dated May 31, 1932. Disclaimer filed January 18, 1935, by the assignee, *The B. F. Goodrich Company*.

Therefore enters this disclaimer to the claims of the said Letters Patent numbered 6, 10, 12, 16, 20, 30, 31, 32, 33, 34, and 35.

[*Official Gazette February 26, 1935.*]